(12) United States Patent
Bruno et al.

(10) Patent No.: US 12,595,065 B2
(45) Date of Patent: Apr. 7, 2026

(54) 100% AMBIENT AIR ENVIRONMENTAL CONTROL SYSTEM

(71) Applicant: Hamilton Sundstrand Corporation, Charlotte, NC (US)

(72) Inventors: Louis J. Bruno, Ellington, CT (US); Aiden Coutin, Ogden, UT (US); Kayla Gosse, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 113 days.

(21) Appl. No.: 17/734,595

(22) Filed: May 2, 2022

(65) Prior Publication Data

US 2023/0348072 A1 Nov. 2, 2023

(51) Int. Cl.
| | |
|---|---|
| *B64D 13/08* | (2006.01) |
| *F02K 7/10* | (2006.01) |
| *B64D 13/06* | (2006.01) |

(52) U.S. Cl.
CPC .............. *B64D 13/08* (2013.01); *F02K 7/10* (2013.01); *B64D 2013/0618* (2013.01); *F05D 2260/232* (2013.01)

(58) Field of Classification Search
CPC ........ B64D 13/08; B64D 13/06; B64D 13/02; B64D 13/006; B64D 2013/0618; B64D 2013/0688; B64D 2013/0611; B64D 2013/064; B64D 2013/0644;
(Continued)

(56) References Cited

U.S. PATENT DOCUMENTS

| | | | | |
|---|---|---|---|---|
| 5,461,882 | A | * 10/1995 | Zywiak | B64D 13/06 |
| | | | | 62/401 |
| 9,580,180 | B2 | 2/2017 | Jonqueres et al. | |
| 10,457,399 | B2 * | 10/2019 | Bammann | B64D 13/06 |

(Continued)

FOREIGN PATENT DOCUMENTS

| | | |
|---|---|---|
| EP | 3363740 A1 | 8/2018 |
| EP | 3480113 A1 | 5/2019 |

(Continued)

OTHER PUBLICATIONS

Extended European Search Report and Written Opinion for European Application No. 23171022.9; Report Mail Date Sep. 26, 2023 (8 Pages).

(Continued)

*Primary Examiner* — Gordon A Jones
(74) *Attorney, Agent, or Firm* — CANTOR COLBURN LLP

(57) ABSTRACT

An environmental control system includes a ram air circuit having a ram air duct and at least one ram heat exchanger arranged within the ram air duct, a compression device, and an expansion device. The compression device is configured to receive at least one of a first medium, a second medium, and a third medium. The environmental control system is operable in a plurality of modes including at least one normal mode and a failure mode. In the at least one normal mode, the first medium output from the compression device is exhausted into the ram air duct upstream from the at least one ram heat exchanger, and in the failure mode, only the third medium output from the compression device is exhausted into the ram air duct upstream from the at least one ram heat exchanger.

13 Claims, 4 Drawing Sheets

(58) Field of Classification Search
CPC ........ B64D 2013/0655; B64D 2221/00; B64D
33/02; B64D 33/04; F02C 6/08
See application file for complete search history.

(56) References Cited

U.S. PATENT DOCUMENTS

| | | | | |
|---|---|---|---|---|
| 11,136,130 | B2 * | 10/2021 | Bruno | B64D 13/06 |
| 11,174,031 | B2 | 11/2021 | Ho et al. | |
| 11,192,655 | B2 | 12/2021 | Bruno et al. | |
| 2006/0196216 | A1 * | 9/2006 | Bruno | F25B 9/004 |
| | | | | 62/402 |
| 2007/0119205 | A1 * | 5/2007 | Zywiak | B64D 13/06 |
| | | | | 62/401 |
| 2014/0305610 | A1 * | 10/2014 | Zywiak | F28F 27/00 |
| | | | | 165/11.1 |
| 2014/0352348 | A1 * | 12/2014 | Army, Jr. | B64D 13/06 |
| | | | | 62/401 |

| | | | | |
|---|---|---|---|---|
| 2016/0131431 | A1 * | 5/2016 | Army | F28D 9/0068 |
| | | | | 29/890.03 |
| 2018/0331599 | A1 * | 11/2018 | Parlante | H02K 9/04 |
| 2019/0112052 | A1 | 4/2019 | Bruno et al. | |
| 2021/0053687 | A1 | 2/2021 | Bruno et al. | |
| 2022/0048635 | A1 * | 2/2022 | Galzin | B64D 13/08 |

FOREIGN PATENT DOCUMENTS

| | | |
|---|---|---|
| EP | 3489142 A2 | 5/2019 |
| EP | 3945025 A1 | 2/2022 |
| EP | 3945027 A1 | 2/2022 |

OTHER PUBLICATIONS

European Search Report; Application No. 23 171 022.9; mailed Feb. 26, 2025; 4 pages.

* cited by examiner

100% AMBIENT AIR ENVIRONMENTAL CONTROL SYSTEM

BACKGROUND

Exemplary embodiments pertain to the art of environmental control systems, and more particularly, to an environmental control system of an aircraft.

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin. Unfortunately, each of these approaches provides limited efficiency with respect to engine fuel burn.

BRIEF DESCRIPTION

According to an embodiment, an environmental control system includes a ram air circuit having a ram air duct and at least one ram heat exchanger arranged within the ram air duct, a compression device, and an expansion device. The compression device is configured to receive at least one of a first medium, a second medium, and a third medium. The environmental control system is operable in a plurality of modes including at least one normal mode and a failure mode. In the at least one normal mode, the first medium output from the compression device is exhausted into the ram air duct upstream from the at least one ram heat exchanger, and in the failure mode, only the third medium output from the compression device is exhausted into the ram air duct upstream from the at least one ram heat exchanger.

In addition to one or more of the features described herein, or as an alternative, in further embodiments in the failure mode, at least a portion of the first medium output from the compression device is exhausted overboard.

In addition to one or more of the features described herein, or as an alternative, in further embodiments in the failure mode, at least a portion of the first medium output from the compression device is exhausted into the ram air duct downstream from the at least one ram heat exchanger.

In addition to one or more of the features described herein, or as an alternative, in further embodiments in the at least one normal mode and the failure mode, only the second medium is provided to an outlet of the environmental control system.

In addition to one or more of the features described herein, or as an alternative, in further embodiments the first medium is bleed air and the second medium is ambient air.

In addition to one or more of the features described herein, or as an alternative, in further embodiments the expansion device is a two-wheel air cycle machine.

In addition to one or more of the features described herein, or as an alternative, in further embodiments the expansion device includes a fan operably coupled to another turbine via another shaft, the fan being arranged in fluid communication with a portion of the ram air circuit.

In addition to one or more of the features described herein, or as an alternative, in further embodiments during operation in at least one of the plurality of modes, work is extracted from both the first medium and the third medium in the compression device to drive the compressor.

In addition to one or more of the features described herein, or as an alternative, in further embodiments in the at least one normal mode, both the first medium and the third medium output from the compression device are exhausted into the ram air duct upstream from the at least one ram heat exchanger.

In addition to one or more of the features described herein, or as an alternative, in further embodiments in the at least one normal mode, both the first medium and the third medium output from the compression device are mixed at a mixing point located upstream from the into the ram air circuit.

In addition to one or more of the features described herein, or as an alternative, in further embodiments the at least one ram heat exchanger further comprises a first heat exchanger, a second heat exchanger, and a divider extending parallel to a flow through the ram air duct. The divider is positioned to form a first portion and a second portion of the first heat exchanger and the second heat exchanger, respectively.

In addition to one or more of the features described herein, or as an alternative, in further embodiments the first medium output from the compression device is exhausted into the ram air duct at a location in fluid communication with the second portion of the first heat exchanger and the second heat exchanger.

In addition to one or more of the features described herein, or as an alternative, in further embodiments a flow of ram air is arranged in fluid communication with the first portion of the first heat exchanger and the second heat exchanger.

In addition to one or more of the features described herein, or as an alternative, in further embodiments the environmental control system is part of an aircraft.

In addition to one or more of the features described herein, or as an alternative, in further embodiments the aircraft further comprises a plurality of pressurized air systems, and in the at least one normal mode, the environmental control system is configured to receive the first medium from the plurality of pressurized air systems and in the failure mode, the environmental control system is configured to receive air from only one of the plurality of pressurized air systems.

According to an embodiment, a method of operating an environmental control system of a vehicle includes providing a first medium and a second medium to the environmental control system, compressing the second medium within a compressor of a compression device, expanding the first medium within a first turbine of the compression device, the first turbine being operably coupled to the compressor by a shaft, exhausting the first medium output from the first turbine into a ram air circuit upstream from at least one ram heat exchanger during at least one normal mode, and exhausting the first medium output from the first turbine during a failure mode.

In addition to one or more of the features described herein, or as an alternative, in further embodiments in both the at least one normal mode and the failure mode, delivering a conditioned form of the second medium to an outlet of the environmental control system.

In addition to one or more of the features described herein, or as an alternative, in further embodiments the second medium is outside air.

In addition to one or more of the features described herein, or as an alternative, in further embodiments comprising expanding a third medium within a second turbine of the compression device, the second turbine being operably coupled to the compressor and the first turbine by the shaft and exhausting the third medium output from the second turbine into the ram air circuit upstream from the at least one ram heat exchanger during the at least one normal mode.

In addition to one or more of the features described herein, or as an alternative, in further embodiments comprising exhausting the third medium output from the second turbine into the ram air circuit upstream from the at least one ram heat exchanger during the failure mode.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments herein provide an environmental control system of an aircraft that uses mediums from different sources to power the environmental control system and to provide cabin pressurization and cooling at a high fuel burn efficiency. The medium can generally be air, while other examples include gases, liquids, fluidized solids, or slurries.

Figure 1:
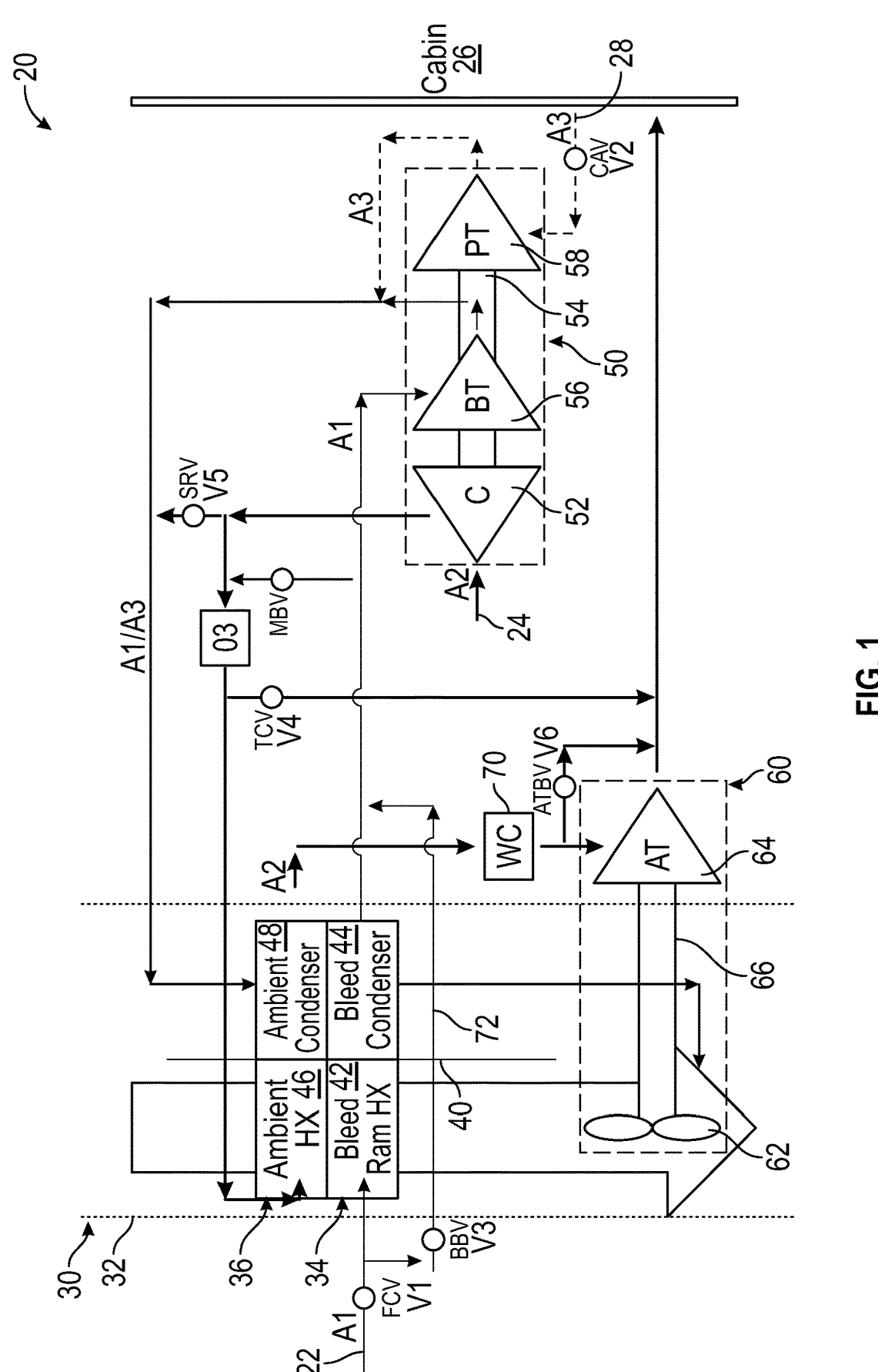
FIG. 1 is a schematic diagram of an environmental control system according to an embodiment.

With reference now to the FIG. 1, an example of a schematic diagram of a portion of an environment control system (ECS) 20, such as an air conditioning unit or pack for example, is depicted according to a non-limiting embodiment. Although the environmental control system 20 is described with reference to an aircraft, alternative applications, such as another vehicle for example, are also within the scope of the disclosure. As shown, the ECS 20 may be configured to receive a first medium A1 at a first inlet 22. In embodiments where the ECS 20 is used in an aircraft application, the first medium A1 is bleed air, which is pressurized air originating from, i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The ECS 20 may alternatively or additionally be configured to receive a second medium A2 at a second inlet 24 and may provide a conditioned form of the second medium A2 to a volume 26 during normal operation. In an embodiment, the second medium A2 is fresh air, such as outside air for example. The outside air can be procured via one or more scooping mechanisms, such as an impact scoop or a flush scoop for example. Thus, the second inlet 24 can be considered a fresh or outside air inlet. In an embodiment, the second medium A2 is ram air drawn from a portion of a ram air circuit to be described in more detail below. Generally, the second medium A2 described herein is at an ambient pressure equal to an air pressure outside of the aircraft when the aircraft is on the ground and is between an ambient pressure and a cabin pressure when the aircraft is in flight.

The ECS 20 may be configured to receive a third medium A3 at a third inlet 28. In one embodiment, the second inlet 24 is operably coupled to a volume 26, such as the cabin of an aircraft, and the third medium A3 is cabin discharge air, which is air leaving the volume and that would typically be discharged overboard. In some embodiments, the ECS 20 is configured to extract work from the third medium A3. In this manner, the pressurized air A3 of the volume 26 can be utilized by the ECS 20 to achieve certain operations.

As shown, the ECS 20 may include a ram air circuit 30 including a shell or duct 32 within which one or more heat exchangers are located. The ram air duct 32 can receive and direct a medium, such as ram air for example, through a portion of the ECS 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the ram air duct 32 may be referred to as ram heat exchangers. In the illustrated, non-limiting embodiment, the at least one ram heat exchanger includes a first or first heat exchanger 34 and a second or second heat exchanger 36. Within the heat exchangers 34, 36, ram air, such as outside air for example, acts as a heat sink to cool a medium passing there through, for example the first medium A1 and/or the second medium A2. Although a ram air circuit 30 having only two heat exchangers 34, 36 is illustrated, it should be understood that embodiments having only a single heat exchanger, or alternatively, more than two heat exchangers are also contemplated herein.

In an embodiment, the first heat exchanger 34 is separated, such as by a divider 40 for example, into a first portion 42 and a second portion 44, respectively. However, embodiments where the first portion 42 and the second portion 44 are formed by two distinct heat exchangers that are fluidly coupled to one another are also contemplated herein. Alternatively, or in addition, the second heat exchanger 36 may also be separated, such as via the divider 40, into a first portion 46 and a second portion 48, respectively.

As will be described in more detail below, the flows of different mediums will be provided to the first and second portions 42, 44, 46, and 48 of the first and second heat exchangers 34, 36, respectively. For example, ram air may be provided to only one side of the divider 40, such as to only the first portions of the first and second heat exchanger. It should be noted that the divider 40 may extend beyond the heat exchangers such that the flows provided to each side of the divider 40 generally separate over the length of the ram air duct.

The ECS 20 additionally includes at least one compression device, and in some embodiments includes a plurality of compression devices. Each compression device is a mechanical device that includes components for performing thermodynamic work on a medium (e.g., extracts work from or applies work to the first medium A1, the second medium A2 by raising and/or lowering pressure and by raising and/or lowering temperature). Examples of a compression device include an air cycle machine, a two-wheel air cycle machine, a three-wheel air cycle machine, a four-wheel air cycle machine, etc.

In the illustrated, non-limiting embodiments, the ECS 20 includes a single compression device 50. However, embodiments including more than one compression device are also contemplated herein. The compression device 50 may include a compressor 52 and at least one turbine operably coupled by a shaft 54. In an embodiment, best shown in FIGS. 1 and 3, the compression device 50 includes two turbines 56 and 58. In another embodiment, shown in FIGS. 2 and 4, the compression device 50 includes three turbines 56, 58, and 59. In such embodiments, the first medium A1 may be configured to flow through a single turbine, or alternatively, through two of the turbines in series based on a mode of operation.

A compressor 52 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine, such as any of turbines 56, 58, and 59 for example, is a mechanical device that expands a medium and extracts work therefrom (also referred to as extracting energy) to drive the compressor 52 via the shaft 54.

In an embodiment, the environmental control system 20 additionally includes an expansion device 60. The compression device 50 and the expansion device 60 may be arranged in series relative to at least one flow of medium, such as the flow of the second medium A2 for example, during at least one mode of operation of the ECS 20. The expansion device 60 may be a simple cycle or two-wheel machine, located separately from the compression device 50. As shown, the expansion device 60 has only a fan 62 and a turbine 64 operably coupled by a shaft 66. A fan 62 is a mechanical device that can force via push or pull methods air through the shell of the ram air duct, across at least a portion of the ram air heat exchangers. However, embodiments where the fan 62 is a component separate from a compression device and driven by any suitable means are also contemplated herein. In an embodiment, as will be described in more detail below, the second medium A2 is only provided to the turbine 64 of the expansion device 60 when the aircraft is in a certain mode of operation, such as when the aircraft is on the ground for example.

The elements of the ECS 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the ECS 20 can be regulated to a desired value. For instance, a first valve V1 may be configured to control a supply of the first medium A1 to the ECS 20, and a second valve V2 may be configured to control a supply of the third medium A3 to the ECS 20. A third valve V3, may be operable to allow a portion of a medium, such as the first medium A1, to bypass the ram air circuit 30. As a result, operation of the third valve V3 may be used to add heat to the ECS 20 and to drive the compression device 50 when needed.

Operation of a fourth valve V4 located downstream from the compressor 52 may be used to allow a portion of the second medium A2 to bypass the remainder of the ECS 20. Accordingly, flow from the fourth valve V4 is provided generally directly to an outlet of the ECS 20. In an embodiment, a fifth valve V5 is a surge control valve, operable to exhaust a portion of the second medium A2 output from the compressor 52 overboard or into the ram air circuit 30 to prevent a compressor surge. In an embodiment, a sixth valve V6 is operable to allow a supply of a medium, such as the second medium A2 for example, to bypass the turbine 64 of the expansion device 60. In the non-limiting embodiment of FIG. 2, a seventh valve V7, is arranged at the interface between the first and third turbines 56, 59 of the compression device 50. Accordingly, valve V7 may be used to control the amount of energy extracted from the first medium A1 by providing the flow to the turbines 55, 59 individually, or in series.

An ECS 20 as described herein is operable in a plurality of modes selectable in part based on a flight condition of the vehicle containing the ECS 20. Examples of normal modes of operation include a first, low altitude mode and a second, high altitude mode. The first, low altitude mode is typically used for ground and low altitude flight conditions, such as ground idle, taxi, take-off, and hold conditions, and the second, high altitude mode may be used at high altitude cruise, climb, and descent flight conditions.

With continued reference to the FIG. 1, in a first, low altitude mode, valve V1 is open and a high pressure first medium A1, such as bleed air drawn from an engine or APU, is provided to the first heat exchanger 34. In the illustrated, non-limiting embodiment, all or at a portion of the first medium A1 is provided to the first heat exchanger 34. As shown, the first medium A1 is configured to flow through the first portion 42 of the first heat exchanger 34 and the second portion 44 of the first heat exchanger 34 in series. However, it should be understood that in other embodiments, the first portion 42 may be located downstream from the second portion 44 relative to the flow of the first medium A1. In the first, low altitude mode, the first medium A1 within the first portion 42 of the first heat exchanger 34 is cooled via a flow of ram air, driven through the ram air duct 32, such as on one side of the divider 40, by the fan 62 of the expansion device 60. In the second portion 44 of the first heat exchanger 34, the first medium A1 is cooled by a flow of the first medium A1 output from the compression device 50, to be described in more detail below.

During operation of the ECS 20 of FIG. 1 in the first, low altitude mode, the cool first medium A1 output from the first heat exchanger 34 may be provided directly to the first turbine 56 of the compression device 50. Within the first turbine 56, the high pressure first medium A1 is expanded and work is extracted therefrom. The first medium A1 output from the first turbine 56 has a reduced temperature and pressure relative to the first medium A1 provided to the inlet of the first turbine 56.

In the illustrated, non-limiting embodiment, the first medium A1 output from the first turbine 56 of the compression device 50 is then provided to the ram air circuit 30. As shown, this cooled flow of the first medium A1 output from the compression device 50 is exhausted into the ram air duct 32 on an opposite side of the divider 40 as the ram air such that the ram air and the first medium A1 do not mix. This first medium A1 within the ram air duct 32 is used to cool the flow of first medium A1 within the second portion 44 of the first heat exchanger 34 before being exhausted overboard.

The work extracted from the first medium A1 in the first turbine 56 drives the compressor 52, which is used to compress a second medium A2 provided thereto, such as from the second inlet 24. The second medium A2, such as fresh air for example, may be drawn from an upstream end of the ram air circuit 30 or from another source and provided to an inlet of the compressor 52. The act of compressing the second medium A2, heats the second medium A2 and increases the pressure of the second medium A2.

In the illustrated, non-limiting embodiment, when the bypass valve V4 and surge valve V5 are closed, the second medium A2 is configured to flow from an outlet of the compressor 52 to the second heat exchanger 36. In the illustrated, non-limiting embodiment, the second medium A2 is provided to the first portion 46 and the second portion 48 of the second heat exchanger 36 in series. However, embodiments where the first portion 46 is arranged downstream from the second portion 48 relative to the flow of the second medium A2 are also contemplated herein. In the first, low altitude mode, the second medium A2 within the first portion 46 of the second heat exchanger 36 is cooled by a flow of ram air, driven by the fan 62 of the expansion device 60. The cooler second medium A2 is then provided to the second portion 48 of the second heat exchanger 36 where the flow is further cooled by the flow of first medium A1 output from the compression device 50.

In the illustrated, non-limiting embodiment, the second heat exchanger 36 is arranged upstream from the first heat exchanger 34 within the ram air duct 32. More specifically, the first portion 46 of the second heat exchanger 36 is arranged upstream from the first portion 42 of the first heat exchanger 34 relative to the flow of ram air through the ram air duct 32 and the second portion 48 of the second heat exchanger 36 is arranged upstream from the second portion 44 of the first heat exchanger 34 relative to the flow of first medium A1 output from the compression device 50 to the ram air duct 32. However, embodiments where at least one portion of the second heat exchanger 36 is arranged downstream from the first heat exchanger 34 relative to the flow of ram air or the first medium A1 within the ram air circuit 30 are also contemplated herein.

From the second heat exchanger 36, the second medium A2 may be provided to a water collector 70 configured to remove condensed water from the second medium A2. The dry second medium A2 is then received at an inlet of the turbine 64 of the expansion device 60. Within the turbine 64, the second medium A2 is expanded and work is extracted therefrom. As shown, the work extracted from the turbine 64 may be used to drive rotation of the fan 62 via the shaft 66 (and therefore draw ram air through at least a portion of the ram air circuit 30). The cooler, lower pressure medium A2 output from the turbine 64 may then be provided to one or more loads, such as to the cabin 26 for example, via an outlet of the system. In the low altitude mode of operation, the third medium A3 is not provided to the environmental control system 20.

With continued reference to FIG. 1, operation of the ECS 20 in the high-altitude mode of operation is similar to the low-altitude mode of operation. However, in some embodiments, valve V3 may be open to allow all or at least a portion of the first medium A1 to bypass the first heat exchanger 34. Valve V3 may be operated to control, and in some embodiments, maximize the temperature of the first medium A1 provided to the compression device 50. As a result, the work extracted from the first medium A1 within at least one turbine 56 of the compression device 50 may be optimized while exhausting the first medium A1 therefrom with a temperature suitable to function as a heat sink with respect to the first portion 42, 46 of the primary and second heat exchangers 34, 36.

In the high-altitude mode of operation, the first medium A1 that has bypassed the first heat exchanger 34, or a combination of the first medium A1 cooled within the first heat exchanger 34 and the first medium A1 that bypassed the first heat exchanger 34 is similarly provided to the turbine 56. As previously noted, within the turbine 56, the first medium A1 is expanded and work is extracted therefrom to drive the compressor 52. The first medium A1 provided at the outlet of the turbine 56 is then dumped into a portion of the ram air circuit 30, such as in fluid communication with the second portions 44, 48 of the primary and second heat exchangers 34, 36.

The flow of the second medium A2 may be similar in both the low-altitude mode and the high-altitude mode. However, in an embodiment, in the second, high-altitude mode of operation, valve V6 is open such that the second medium A2 bypasses the turbine 64 of the expansion device 60. In such embodiments, the second medium A2 as conditioned at the outlet of the second heat exchanger 36, or at the outlet of the water collector 70, is provided to the one or more loads of the aircraft, such as the cabin 26 for example.

Further, because the second medium A2 bypasses the turbine 64 of the expansion device 60, rotation of the fan 62 is not driven by the turbine 64 in the high-altitude mode. However, the pressure differential between the ram air drawn in, such as via a scoop for example, and an opposite end of the ram air circuit 30 may be sufficient to move air through the ram air circuit 30 without use of the fan 62.

With continued reference to FIG. 1, during the high-altitude mode of operation, the third medium A3, such as an exhaust of cabin air for example, is recirculated to the ECS 20 from the pressurized volume or cabin 26, via the third inlet 28. The flow of the third medium A3, which may be controlled by valve V2, may be provided directly to an inlet of the second turbine 58, also referred to herein as a "power turbine," of the compression device 50. The additional work extracted from the third medium A3 within the second turbine 58 is used in combination with the work extracted from the first medium A1 in at least one other turbine of the compression device 50, such as turbine 58 for example, to drive the compressor 52.

As shown, the third medium A3 may be mixed with the first medium A1 output from the turbine 56 at a mixing point located upstream from the ram air circuit 30. In the illustrated, non-limiting embodiment, the mixing point is located downstream from the outlet of turbine 56 and turbine 58. In the high-altitude mode of operation, this mixture of first medium A1 and third medium A3 may be used to cool the second medium A2 within the second portion 48 of the second heat exchanger 36, and/or to cool the first medium A1 within the second portion 44 of the first heat exchanger 34, before being dumped or exhausted overboard.

Figure 2:
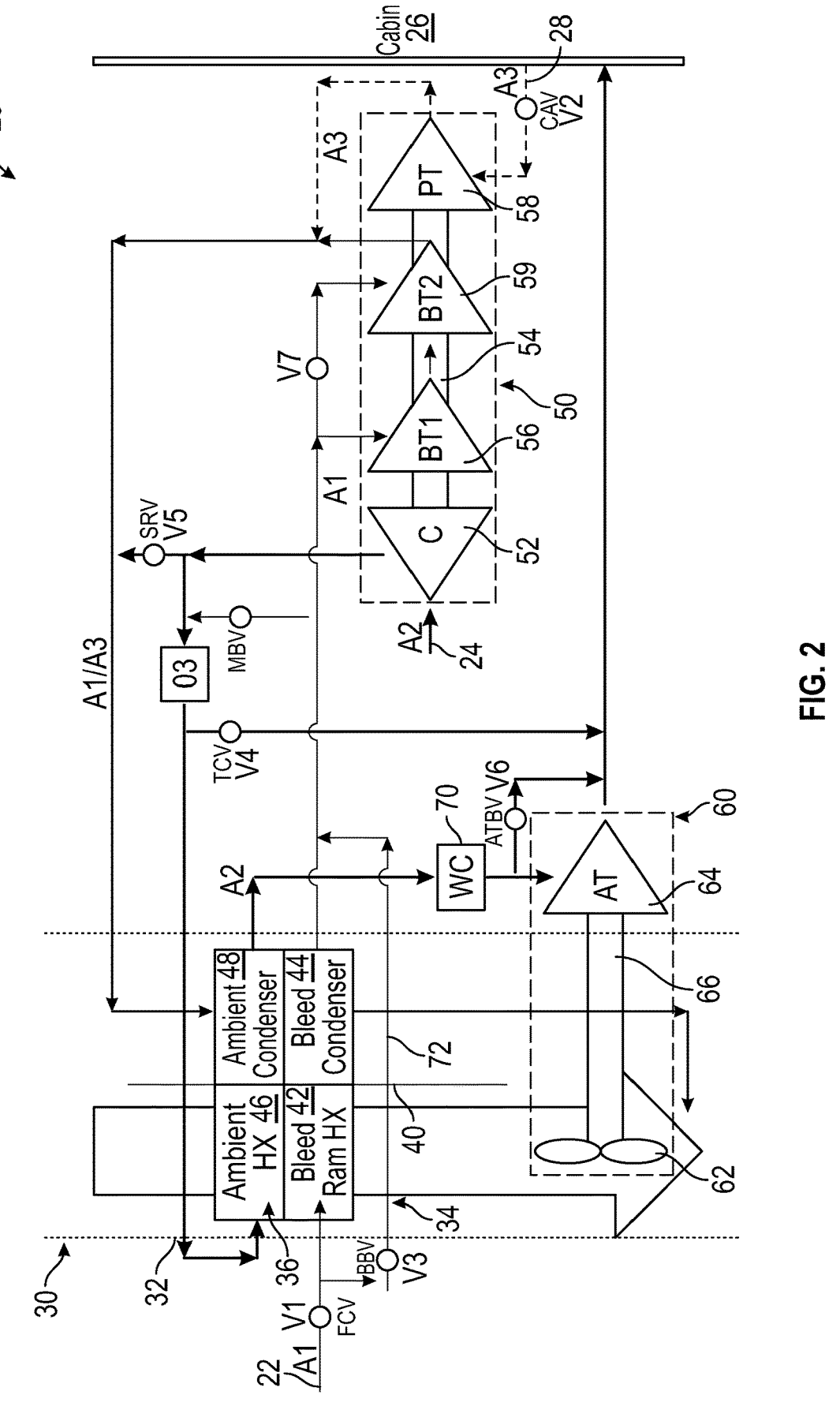
FIG. 2 is a schematic diagram of an environmental control system according to an embodiment.

With reference now to FIG. 2, operation of the illustrated ECS is substantially identical to the environmental control system illustrated in FIG. 1. However, during operation of the ECS 20 of FIG. 2 in a first mode, valve V7 is open, such that the cool first medium A1 output from the first heat exchanger 34 is configured to bypass the first turbine 56, and instead is provided directly to the third turbine 59 of the compression device 50. Within the third turbine 59, the high pressure first medium A1 is expanded and work is extracted therefrom. The first medium A1 output from the third turbine 59 has a reduced temperature and pressure relative to the first medium A1 provided to the inlet of the third turbine 59. As previously described, the first medium A1 output from the third turbine 59 of the first compression device 30*a* is then provided to a portion of the ram air circuit 30 associated with the second portions 44, 48 of the heat exchangers 34, 36. This first mode of operation may be suitable for use with low bleed pressures (such as less than about 25 psi), or alternatively, during failure conditions.

The second mode of operation of the ECS 20 of FIG. 2 is also similar to that of FIG. 1; however, in the second mode, valve V7 is closed such that the first medium A1 is provided to the first turbine 56 and the third turbine 59 in series. In each of these turbines 56, 59, the first medium A1 is expanded and work is extracted therefrom to drive the compressor 52. As previously described, the first medium A1 provided at the outlet of the third turbine 59 is then dumped into a portion of the ram air circuit 30. It should be understood that operation of the ECS 20 in the second mode may be used during both ground and cruise operations.

In the embodiments of the ECS 20 shown in FIGS. 1 and 2, the valve V3 is arranged within a bypass conduit 72, in parallel with the first heat exchanger 34. As a result, only the portion of the first medium A1 that bypasses the first heat exchanger 34 passes therethrough. Accordingly, the third valve shown in V3 may be a simple valve transformable between an open and closed position.

Figure 3:
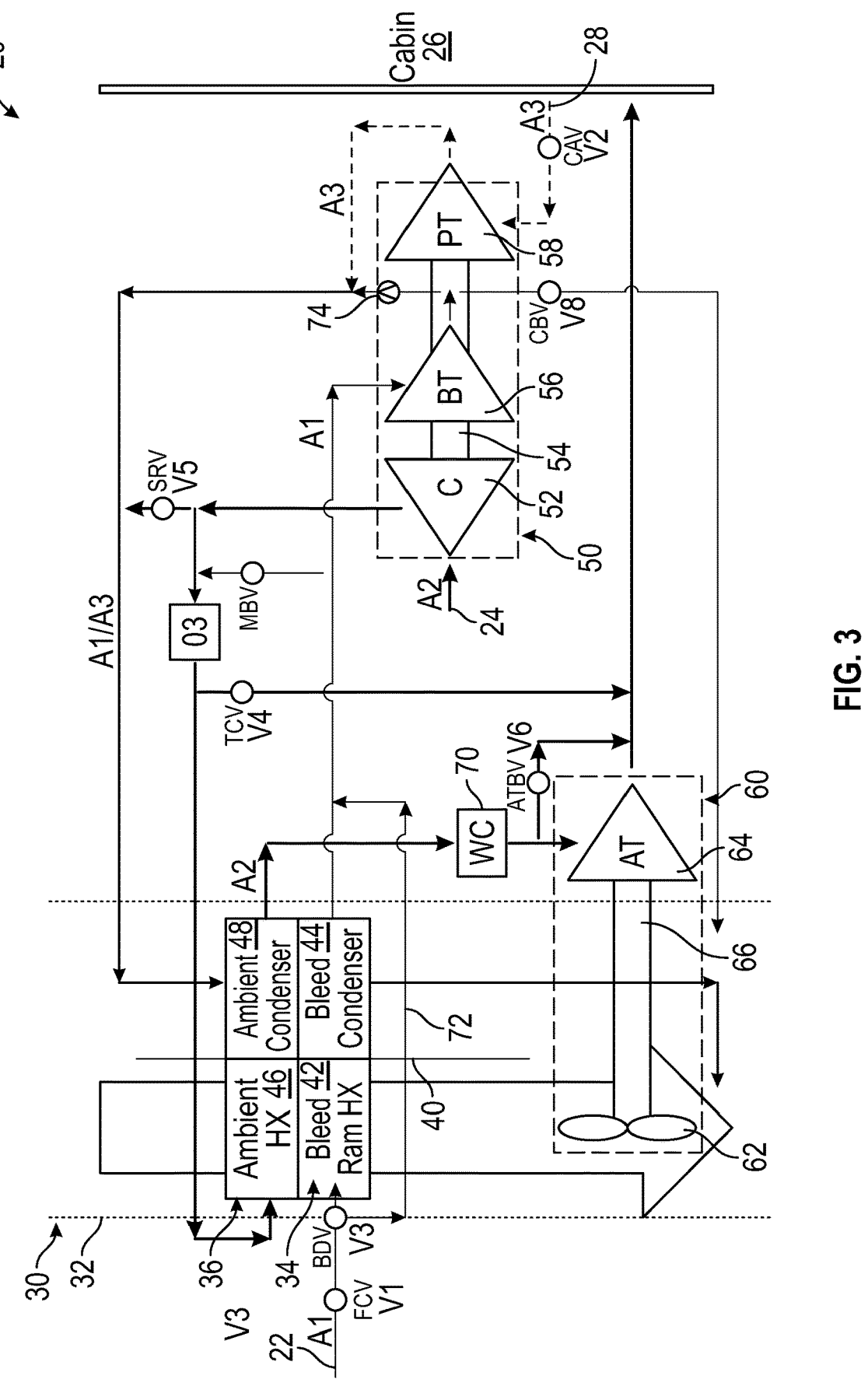
FIG. 3 is a schematic diagram of an environmental control system according to an embodiment.
Figure 4:
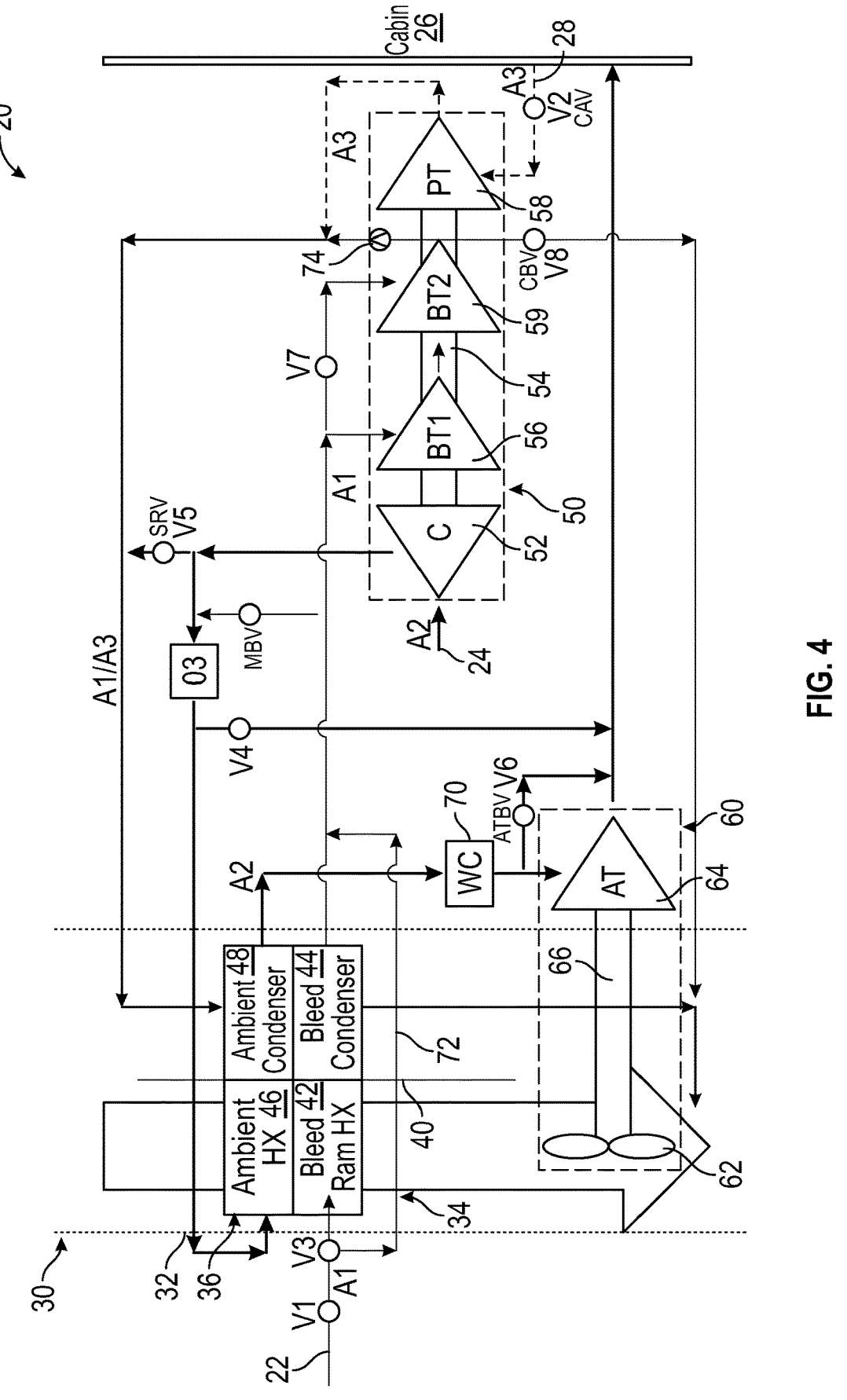
FIG. 4 is a schematic diagram of an environmental control system according to an embodiment.

With reference now to FIGS. 3 and 4, the illustrated environmental control systems are substantially identical to the environmental control system illustrated in FIGS. 1 and 2, respectively. However, in the embodiments shown in FIGS. 3 and 4, the third valve V3 operable to control a flow of the first medium A1 configured to bypass the first heat exchanger 34 is arranged upstream, such as directly upstream, from the inlet of the first heat exchanger 34. By positioning the valve V3 of FIGS. 3 and 4 upstream from the inlet of the first heat exchanger 34 and the bypass conduit 72, the entire flow of the first medium A1 is configured to pass through the valve V3, regardless of whether the flow is provided to or bypasses the first heat exchanger 34. In such embodiments, the valve V3 may be a three way valve movable between a first position configured to direct all of the flow of the first medium A1 to the first heat exchanger 34, a second position configured to direct all of the flow of the first medium A1 to the bypass conduit 72, and a third position configured to direct a first portion of the flow of the first medium A1 to the first heat exchanger 34 and a second portion of the flow of the first medium A1 to the bypass conduit 72.

With continued reference to FIGS. 3 and 4, in an embodiment, a plurality of parallel flow paths extend from the outlet of the most downstream turbine of the compression device 50 (turbine 56 in FIG. 3, and turbine 59 in FIG. 4) relative to the flow of the first medium A1. As previously described, a first flow path (defined by one or more conduits) is configured to deliver the first medium A1 to a portion of the ram air circuit 30 at a location upstream from at least one of the primary and second heat exchangers 34, 36. In the illustrated, non-limiting embodiment, the first flow path is configured to deliver the first medium A1 output from the most downstream turbine at a location upstream from the second portion 44, 48 of the primary and second heat exchangers 34, 36. A second flow path may be configured to deliver the first medium A1 output from the most downstream turbine to a portion of the ram air circuit 30 downstream from at least one of the primary and second heat exchangers 34, 36, such as near the fan 62 for example. Alternatively, the second flow path may be configured to exhaust the first medium A1 overboard. Although a first and second flow path of the first medium A1 are described herein, embodiments having additional flow paths and/or flow path configured to deliver the first medium A1 to another component of the ECS 20 are also contemplated herein.

A one-way valve or check valve 74 may be arranged within the first fluid flow path, downstream from the outlet of the turbine 56 (FIG. 3) or 59 (FIG. 4). In the illustrated, non-limiting embodiment, the one-way valve 74 is arranged upstream from the location where the third medium A3 is configured to mix with the first medium A1. Accordingly, the one-way valve 74 is operable to prevent the flow of the third medium A3 into the second flow path associated with the first medium A1.

In an embodiment, a valve V8 is operable to control the flow of the first medium A1 within the one or more conduits defining the second flow path. Although valve V8 is illustrated as being arranged within a conduit of the second flow path, embodiments where the valve V8 is arranged at the divergence of the first and second flow paths are also contemplated herein.

Normal operation of the ECS 20 of FIGS. 3 and 4, such as in the first, low-altitude mode and the second, high-altitude mode is substantially identical to operation of the ECS of FIGS. 1 and 2, respectively. During normal operation in both modes, the valve V8 is closed.

As previously noted, the ECS 20 described herein may be one of several packs on an aircraft. Accordingly, each pack may be sized such that the plurality of packs, in combination, meet the demands of the aircraft. Furthermore, during normal operation of the aircraft, each ECS 20 may be configured to receive a flow of the first medium A1 from a respective pressurized air system. In embodiments including a first ECS (first pack) and a second ECS (second pack), the first ECS may be configured to receive first medium A1 from a first pressurized air system and the second ECS 20 may be configured to receive first medium A1 from a second pressurized air system.

In the event of a failure of a pressurized air system and/or of an ECS 20, a remaining functional ECS may be configured to meet the demands of the aircraft. To maintain the pressure and/or flow rate requirements associated with operation in such a failure mode, valve V8 is opened. Accordingly, regardless of the flight condition of the aircraft when in the failure mode, the first medium A1 output from the most downstream turbine of the compression device 50 (turbine 56 in FIG. 3, and turbine 59 in FIG. 4) is either exhausted overboard or dumped into the ram air circuit 30, downstream from the ram air heat exchangers. Accordingly, only the third medium A3 output from the second turbine 58 of the compression device 50 will be provided to the ram air circuit 30 and used to cool the second portions 44, 48 of the primary and second heat exchangers 34, 36. As previously noted, the one way valve or check valve 74 prevents the third medium A3 output from the turbine 58 from flowing into the second flow path as a result of the open valve V8. In an embodiment, the temperature of the first medium A1 provided to the ECS during operation in the failure mode is increased compared to operation in a normal mode, to meet the pressure and/or flow rate requirements of the aircraft. Such a temperature increase may be at least 10° F., at least 15° F., at least 20° F., at least 25° F., or even at least 30° F. However, embodiments where the temperature of the first medium is not varied between normal operation and operation in a failure mode are also contemplated herein.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system comprising:
a ram air circuit having a ram air duct, at least one ram heat exchanger arranged within the ram air duct, and a divider arranged within the ram air duct and extending parallel to a direction of ram air flow through the ram air duct, wherein a first portion of the at least one ram heat exchanger is arranged at a first side of the divider and a second portion of the at least one ram heat exchanger is arranged at a second side of the divider;
a compression device including a compressor, a first turbine, and a second turbine operably coupled by a shaft, the compression device being configured to receive at least one of a first medium, a second medium, and a third medium, wherein an outlet of the first turbine and an outlet of the second turbine are both fluidly connected to only the second portion of the ram air duct at a location upstream from the second portion of the at least one ram heat exchanger; and
an expansion device, separate from the compression device, the expansion device including another turbine, an inlet of the another turbine being fluidly connected to an outlet of the compressor relative to a flow of the second medium.

2. The environmental control system of claim 1, wherein an outlet of the first turbine is fluidly connected to an exterior of the vehicle such that at least a portion of the first medium output from the first turbine is exhausted overboard.

3. The environmental control system of claim 1, wherein an outlet of the first turbine is fluidly connected to the ram air duct at a location downstream from the at least one ram heat exchanger.

4. The environmental control system of claim 1, wherein in the at least one normal mode and the failure mode, only the second medium is provided to an outlet of the environmental control system.

5. The environmental control system of claim 1, wherein the first medium is bleed air and the second medium is ambient air.

6. The environmental control system of claim 1, wherein the expansion device is a two-wheel air cycle machine.

7. The environmental control system of claim 1, wherein the expansion device includes a fan operably coupled to the another turbine via another shaft, the fan being arranged in fluid communication with a portion of the ram air circuit.

8. The environmental control system of claim 1, wherein during operation in at least one of the plurality of modes, work is extracted from both the first medium and the third medium via at least one of the first turbine and the second turbine of the compression device to drive the compressor.

9. The environmental control system of claim 8, wherein in the at least one normal mode, an outlet of at least one of the first turbine and the second turbine is fluidly connected to the ram air duct such that at least one of the first medium and the third medium is exhausted from the compression device into the ram air duct upstream from the at least one ram heat exchanger.

10. The environmental control system of claim 9, wherein in the at least one normal mode, both the first medium and the third medium are mixed at a mixing point located downstream from the compression device and upstream from the at least one ram heat exchanger.

11. The environmental control system of claim 1, wherein a flow of ram air is arranged in fluid communication with the first portion of the at least one ram heat exchange.

12. The environmental control system of claim 1, wherein the environmental control system is part of an aircraft.

13. The environmental control system of claim 12, wherein the aircraft further comprises a plurality of pressurized air systems, and in the at least one normal mode, the environmental control system is configured to receive the first medium from the plurality of pressurized air systems and in the failure mode, the environmental control system is configured to receive air from only one of the plurality of pressurized air systems.

* * * * *